United States Patent Office 3,328,353
Patented June 27, 1967

3,328,353
POLYEPOXIDES OF THIOMETHYL DIPHENYL OXIDE
Bart J. Bremmer, Midland, Mich., assignor to The Dow Chemical Company, Midland, Mich., a corporation of Delaware
No Drawing. Filed Oct. 29, 1964, Ser. No. 407,562
7 Claims. (Cl. 260—47)

This invention relates to an epoxy resin which is useful as a potting compound, an adhesive, an impregnating resin for fiber reinforced resinous products, and the like. More particularly this invention concerns epoxy resins obtained by the reaction of an epihalohydrin with thiomethylated diphenyl oxide.

These new epoxy resins which contain the diphenyl oxide group have a lower viscosity and longer pot life than similar epoxy resins such as the diglycidyl ether of 2,2-bis(4-hydroxyphenyl) propane, i.e. bisphenol A. These properties make the new resins particularly valuable for uses where a low viscosity is desired without the use of solvents. Also the resins find utility in the manufacture of various resinous products wherein it is desirable to mix the curing agent with large volumes of the resin without danger that the pot life of the mixture will be something less than the time required to consume the resin.

The thiomethylated diphenyl oxide used in the preparation of these resins can be produced by reacting the corresponding chloromethylated diphenyl oxide with sodium hydrosulfide. The epoxy resin is produced by reacting the thiomethylated diphenyl oxide with an epihalohydrin such as epichlorohydrin in the presence of a strong caustic such as sodium hydroxide. These novel epoxy resins can be represented by the following general formula:

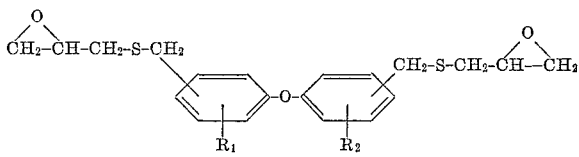

where $R_1$ and $R_2$ individually can be either a hydrogen atom or another glycidyl thiomethyl group, i.e.

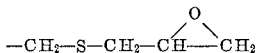

The preparation of these resins is illustrated in the following examples.

*Example 1*

39.3 grams of 4,4'-dithiomethyl diphenyl oxide (prepared by reacting 4,4'-dichloromethyl diphenyl oxide with sodium hydrosulfide) was dissolved in 138.8 grams of epichlorohydrin in a flask equipped with a stirrer, thermometer, addition funnel and condenser. The reactor system was placed under a vacuum of about 12.5 inches Hg and the solution heated to about 92° C. At this time the addition of 25.2 grams of 50 percent aqueous solution of sodium hydroxide was started. The solution was added over a period of about one hour while distilling an azeotropic mixture of water and epichlorohydrin which was condensed, separated and the epichlorohydrin layer returned to the flask. When all of the caustic had been added, the excess epichlorohydrin was removed by distillation and replaced with about an equal volume of toluene. The by-product salt was filtered from this dilute solution then the toluene was removed by vacuum distillation. About 48 grams of resin having an epoxide equivalent weight of 279 and a Gardner viscosity between Z–2 and Z–3 (about 5000 centipoises) were obtained.

The low viscosity of this resin can be compared with that of an epoxy resin produced from epichlorohydrin and bisphenol A having an epoxide equivalent weight of about 190 an a viscosity between 11,000 and 16,000 centipoises.

*Example 2*

Thiomethyldiphenyl oxide was prepared by reacting sodium hydrosulfide with a chloromethylated diphenyl oxide (CMDPO) mixture containing about 27.3 percent chlorine. The isomer distribution in the mixture was approximately as follows:

| | Percent |
|---|---|
| Unreacted diphenyl oxide | 0.7 |
| Mono ortho CMDPO | 1.2 |
| Mono para CMDPO | 6.9 |
| Ortho para' di CMDPO | 22.9 |
| Para para' di CMDPO | 46.1 |
| Tri CMDPO | 18.3 |
| Tetra CMDPO | 1.9 |
| Not accounted for | 2.0 |

A reaction flask similar to that employed in Example 1 was charged with 231 grams of epichlorohydrin and 65.5 grams of the above thiomethyldiphenyl oxide mixture. After heating the contents of the flask to 107° C., 44 grams of a 50 percent aqueous solution of sodium hydroxide were added over a period of one hour while maintaining the temperature between 107 and 109° C. at atmospheric pressure. An azeotropic mixture of water and epichlorohydrin was distilled from the flask as the caustic was added. The epichlorohydrin was separated from the distillate and returned to the flask. After all of the caustic had been added, the excess epichlorohydrin was distilled off and replaced with about an equal volume of toluene. The by-product salt was filtered from the toluene solution then the toluene was removed by vacuum distillation, producing about 84.3 grams of a low viscosity resin. The resin product had an epoxide equivalent weight of 265, a Gardner color of 8–9 and a Gardner viscosity between Z–1 and Z–2 (about 3700 centipoises).

*Example 3*

The resin produced in this example employed a thiomethyldiphenyl oxide mixture containing about 32.0% chlorine and was obtained by reacting sodium hydrosulfide with a chloromethylated diphenyl oxide (CMDPO) mixture having the following isomer distribution:

| | Percent |
|---|---|
| Ortho para' di CMDPO | 1.5 |
| Meta para' di CMDPO | 3.7 |
| Para para' di CMDPO | 15.9 |
| Tri CMDPO | 63.7 |
| Tetra CMDPO | 15.1 |
| Not accounted for | 0.1 |

The reaction flask was charged with 103 grams of the thiomethyldiphenyl oxide mixture and 462.5 grams of epichlorohydrin and the reaction conducted in the same manner as in Example 2, using 88 grams of the 50 percent caustic solution. The resinous product had an epoxide equivalent weight of 278.

These epoxy resins can be cured with any of the conventional epoxy resin hardeners such as the primary and secondary polyamines, polycarboxylic acid anhydrides, polyamides and the catalytic curing agents such as tertiary amines and $BF_3$ complexes. The resins prepared in the above examples were cured with methylene dianiline (MDA) and methyl nadic anhydride (MNA), the maleic anhydride adduct of methyl cyclopentadiene. Stoichiometric amounts of MDA were employed and MNA was used at 0.85 mole per epoxide equivalent. Benzyldimethylamine was used in combination with the anhydride curing agent in an amount equal to 1.5 parts per hundred parts of resin. The heat distortion temperatures of the cured resins are reported in Table 1.

TABLE 1.—HEAT DISTORTION TEMPERATURE OF CURED RESINS

| Example No. | Curing Agent | |
|---|---|---|
| | MDA | MNA |
| 1 | 80° C. (1) | |
| 2 | 76° C. (2) | 86° C. (3). |
| 3 | 121° C. (2) | 140° C. (3). |

Cure schedules:
(1) 16 hrs. at room temp., 2 hrs. at 90° C., 1 hr. at 120° C., 1 hr. at 150° C. and 1 hr. at 165° C.
(2) 16 hrs. at 55° C., 2 hrs. at 125° C. and 2 hrs. at 175° C.
(3) 2 hrs. at 90° C. and 20 hrs. at 171° C.

The greater pot life of these resins when mixed with a curing agent is illustrated by the fact that Example No. 1 of Table I remained liquid and free-flowing during the cure cycle until it had been held at the 120° C. level for about 30 minutes. Under the same curing conditions an epoxy resin produced from epichlorohydrin and bisphenol A having an epoxide equivalent weight of about 190 becomes hard after about 16 hours at room temperature. When using polyamines as the curing agent, from about 0.65 to about 1.05 equivalents of amine hydrogen per epoxy equivalent and preferably 1.0 equivalent of amine hydrogen produces a thermoset resin having desirable properties. The anhydride type curing agents can be used in an amount from about 0.65 to about 1.00, and preferably about 0.85, equivalent of anhydride per equivalent of epoxide.

The thiomethylated diphenyl oxides which can be used to produce these novel resins are those containing from one to four and preferably from two to three thiomethyl groups attached to each diphenyl oxide group. Those molecules having a single thiomethyl group produce monoepoxides which do not cross-link with the difunctional curing agents. The molecules having four thiomethyl groups undergo extensive crosslinking so that premature gelation and brittleness sometimes are a problem.

These resins can be used in combination with the common fillers and thickening agents such as glass fibers, silica flour, mica, clay, asbestos and the like. Some of the fillers are known to produce thixotropic properties in the liquid resin which retard sag and run-down in the uncured films on coated articles.

I claim:
1. An epoxy resin having the general formula:

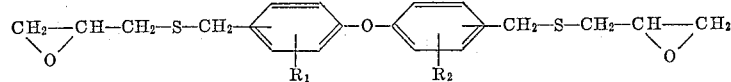

wherein $R_1$ and $R_2$ individually are selected from the group consisting of H and

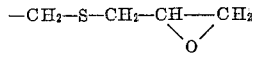

2. An epoxy resin according to claim 1 wherein $R_1$ and $R_2$ are H.
3. An epoxy resin according to claim 1 wherein $R_1$ and $R_2$ are

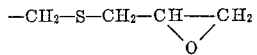

4. An epoxy resin according to claim 1 wherein $R_1$ is H and $R_2$ is

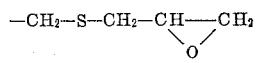

5. A thermosettable epoxy resin mixture having a low viscosity and a long pot life comprising: a resin according to claim 1 together with a curing agent selected from the group consisting of polyamines and polycarboxylic acid anhydrides.
6. A thermosettable epoxy resin mixture according to claim 5 wherein said curing agent comprises a polyamine containing about 1.0 equivalent of amine hydrogen per epoxy equivalent.
7. A thermosettable epoxy resin mixture according to claim 5 wherein said curing agent comprises a polycarboxylic acid anhydride containing about 0.85 equivalent of anhydride per epoxy equivalent.

No references cited.

WILLIAM H. SHORT, *Primary Examiner.*

T. D. KERWIN, *Assistant Examiner.*